(No Model.)
E. M. C. ANDERSON.
CLAMPING DEVICE.
No. 305,497. Patented Sept. 23, 1884.
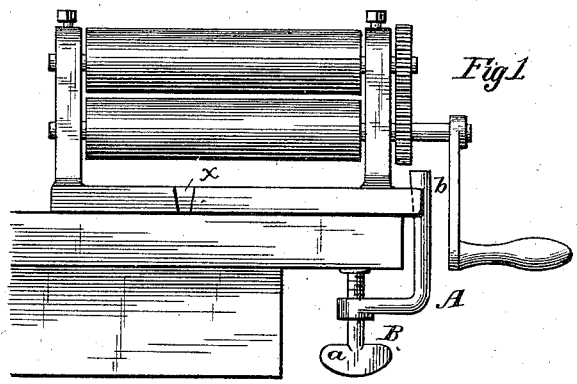
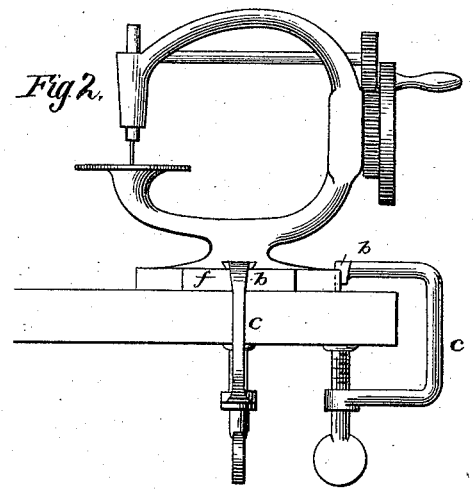
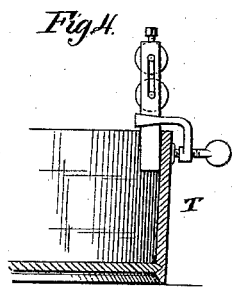
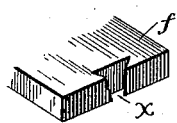
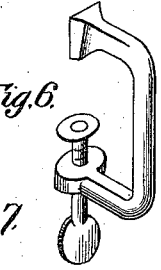
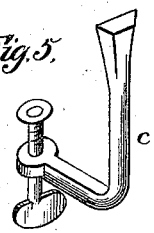
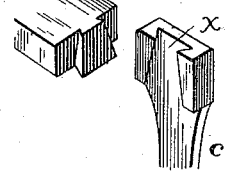
Witnesses:
John G. Hinkel
J. Campbell
E. M. C. Anderson
Inventor:
By her attys
Foster & Freeman

UNITED STATES PATENT OFFICE.

ELIZA M. C. ANDERSON, OF NEW YORK, N. Y.

CLAMPING DEVICE.

SPECIFICATION forming part of Letters Patent No. 305,497, dated September 23, 1884.

Application filed June 20, 1884. (No model.)

*To all whom it may concern:*

Be it known that I, E. M. C. ANDERSON, of the city, county, and State of New York, have invented a certain Improvement in Clamping Devices for Securing Household Articles, &c.; and I do hereby declare the following to be the specification thereof.

The object of my invention is to securely connect fluting-machines, sewing-machines, apple-parers, and other like devices temporarily to their supports, and this object I effect by means of a clamp consisting of a bracket and a dovetailed connection between the two, as fully set forth hereinafter.

In the drawings, Figure 1 represents my improved clamp as applied to securing a fluting-machine to a table-top. Fig. 2 shows the same in connection with a sewing-machine; Fig. 3, a detached perspective view of part of a machine-stand; Fig. 4, a view showing the clamp as arranged for securing a wringer; Figs. 5 and 6, perspective views showing different forms of clamps; Fig. 7, a perspective view showing a modification.

The device consists, essentially, of two parts—a yoke or bracket, A, and a screw, B, which passes through a threaded opening of one arm of the bracket, and can be turned by means of a suitable head or thumb-piece, *a*. The end of the opposite arm of the bracket is expanded and beveled at the edges to form a dovetailed wedge, *b*.

In any suitable part of the frame or stand of the device to be secured or clamped is formed an undercut and tapering recess, *x*, narrowest at the edge of the stand, where it is wide enough to permit the passage of the shank *c* of the bracket, the said recess being adapted for the reception of the wedge end of the bracket when the latter is carried outward or downward after the shank has been passed into the recess. By this construction the bracket may be firmly wedged to the stand, so that the latter cannot turn or swing in any direction independently of the bracket, which, however, can be detached by carrying it longitudinally until the wedge is lifted out of the recess. The connection of the bracket and the stand permits the latter to be clamped to the top of a table or any other object to which it may be desired to fasten it, the stand being placed upon the said top, and the screw being turned until it bears upon the opposite side, when the wedge will be jammed forcibly in its recess and the stand so firmly clamped to the face of the table that it will retain its position under all ordinary circumstances. The position of the recess *x* will depend upon the position in which the article is to be clamped to the table or other object. In Fig. 1 the frame or stand C of the fluting-iron is shown as having two recesses, *x*, one at the end and the other at the side, in which case it may be secured at either the end or at the side at the edge of the table. In Fig. 2 the stand C of the sewing-machine is provided with an extension, *f*, (also shown in Fig. 3,) in which is the vertical recess *x*, adapted to receive the wedge *b*. In Fig. 4 the recess is formed transversely in the side of the frame of a wringer, which may be clamped to the side of a tub, T, by means of a clamping device, as shown.

Where it is not desired that the stand shall extend over the edge of the table or part to which the article is to be clamped, as is necessary when the bracket is L-shaped, as shown in Figs. 1, 4, and 5, the end of the bracket which has the wedge termination is extended laterally to the shank, so as to overhang the table, as shown at the right in Fig. 2.

In ordinary clamps the connection between the clamp and stand is generally a frictional connection, the overhanging end of the clamp simply bearing upon the face of the stand, so that the latter will frequently slip or turn beneath the clamp under the strains to which it is subjected.

It will be seen that by providing the clamp with a wedge-shaped end and the frame with a recess adapted to the same, the clamp and the frame are so connected that one cannot move independently of the other so long as the wedge is in its recess, but that the two parts can at any time be quickly disconnected and used independently.

If desired, the wedge-shaped projection *b* may be formed upon the stand of the article to be clamped, and the recess *x* may be formed in the end of the clamp-bracket, as shown in Fig. 7.

Without limiting myself to the precise construction and arrangement of parts shown, I claim—

1. A clamp consisting of a bracket having at one end a threaded recess to receive a screw and at the other a dovetailed wedge-shaped projection adapted to a correspondingly-shaped recess in the article to be clamped, substantially as set forth.

2. The combination of a bracket carrying a screw and provided with a tapering dovetailed projection, and a stand or frame having a recess adapted to receive the projection on the bracket, substantially as set forth.

3. The combination, with the frame of a machine, of a bracket provided with a clamping-screw at or near one end, the frame and clamp being provided with interlocking dovetail connections, substantially as described.

In testimony whereof I have signed my name to this specification in the presence of two subscribing witnesses.

E. M. C. ANDERSON.

Witnesses:
H. A. HALL,
CHARLES E. FOSTER.